Figure 1:
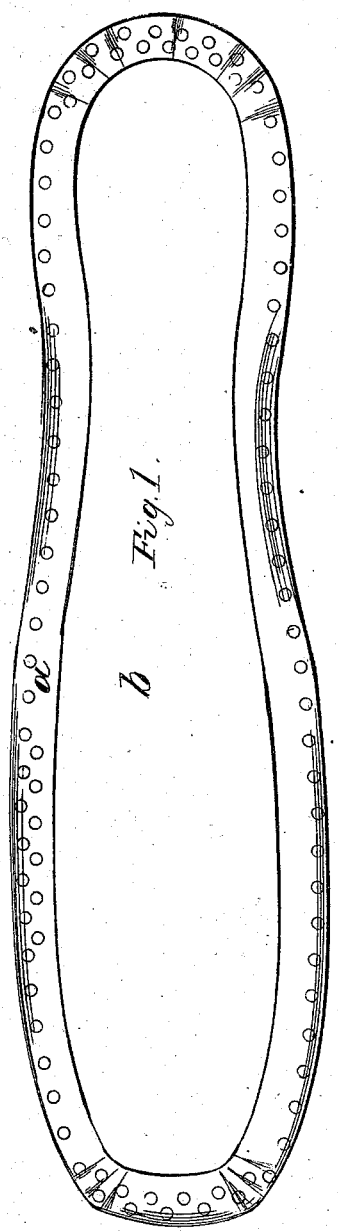

Tyer & Helm,

Rubber.

No. 12,607.  Patented Mar. 27, 1855.

Henry G. Tyer
John Helm

UNITED STATES PATENT OFFICE.

HENRY G. TYER AND JOHN HELM, OF NEW BRUNSWICK, NEW JERSEY.

MANUFACTURE OF BOOTS AND SHOES.

Specification of Letters Patent No. 12,607, dated March 27, 1855.

*To all whom it may concern:*

Be it known that we, HENRY G. TYER and JOHN HELM, of the city of New Brunswick, in the county of Middlesex, in the State of New Jersey, have invented a new and Improved Method of Manufacturing Boots and Shoes; and we do hereby declare that the following is a full and exact description thereof, reference being had to the accompanying drawings and to the letters of reference marked thereon.

The nature of our invention consists in the uniting the insole, upper made wholly or in part of india rubber, and outsole of boots and shoes firmly and durably by means of india rubber or other analogous cements passing through perforations in the upper, in the manner, and under the conditions hereinafter described and set forth.

In the manufacture of india rubber shoes it would be very desirable to attach leather soles thereto but from a peculiar property in vulcanized rubber no cement at present known to the trade will permanently adhere thereto when perfectly vulcanized consequently the manufacturers engaged in this great and extensive business, are limited to the use of rubber compositions only, and united and made into boots and shoes prior to the vulcanization, also the great heat to which rubber goods are subjected in the process of vulcanization (250° to 280° Fahr.) entirely precludes the use of leather and some other material.

We are well aware that an attempt has been made by, and a patent granted to Mr. Hopper of New Brunswick by which he sought to surmount this difficulty by affixing before vulcanization, to the insole and upper of rubber shoes, what may be termed a false or intermediate sole made of muslin or linen uncemented or uncoated with rubber on the outer side;—after vulcanization he attached a leather sole thereto by means of ordinary cement. This method from causes known to the trade was not satisfactory and to the best of our knowledge is now entirely disused.

We claim by our invention to remove all the above mentioned obstacles and to produce by means thereof a boot or shoe combining all the valuable qualities of india rubber with the lightness and elegance attainable by the use of other materials, and boot and shoes so made by this our invention are capable of being resoled when necessary, whereas the ordinary vulcanized rubber shoe when worn or accidentally cut, it is well known can not be repaired and becomes worthless.

To enable others skilled in the manufacture of boots and shoes to use our invention we will proceed to describe minutely our mode of operation.

Having selected a last of the required size, we attach thereto by tacks or other convenience an insole cut from cloth, leather, or any suitable material; we then cement the outer surface thereof with ordinary rubber cement (or any other cement of which rubber or gutta percha is a component part) unless the same has been previously coated with rubber or gutta percha, by any well known process. We then procure the upper as usually cut and fitted and made wholly or in part of vulcanized rubber, and around the lower interior edge we cement the same with cement as aforesaid, about half an inch in width, and when in proper sticking condition, we draw the same over the last and turn down the cemented edge over the insole and roll or hammer it until it closely adheres. We then skive off with a knife the plaits or creases around the toe and heel and produce as near as possible an uniform surface.

So far we have described no novelty, and we adopt this latter process merely for the convenience of maintaining the upper and insole in their relative and true position until with an ordinary shoe maker's punch or other similar tool (the form thereof immaterial) we make perforations around and through the upper until we pierce to the cemented surface of the insole see Figure 1 in drawing annexed, letter, *a*, being the upper of vulcanized india rubber, and, *b*, the insole; where an extra strain may be reasonably anticipated as across the ball and around the toe and heel, we may and do at option make an additional row of perforations to give additional strength (see drawing Fig. 1).

We do not confine ourselves specially to making these perforations after the upper has been, what is technically termed lasted, but the upper may be drawn temporary over the last and with a pointed instrument a mark can be made around the upper as a guide by which the holes may be properly punched or made before the lasting. In either way after the upper is lasted, we proceed to press in and fill up these holes or perforations with the cement alluded to throughout this specification.

Figure 2:
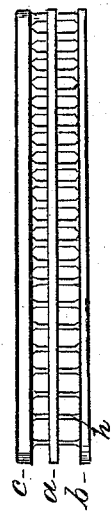

The outer sole having been duly coated and prepared with cement in a similar manner to the insole, when it is arrived at the true sticking condition (known to adepts) it is pressed upon and by hammering and rolling is cemented and united to the insole the cement passing through the upper at intervals and securing the same as firmly and durably as if sewn or stitched. If sufficient strength be used slightly to separate these several parts of a boot or shoe so united as above the rubber filament or thread can be distinctly seen as shown in the drawing annexed Fig. 2.

Having now as we believe clearly explained our new and useful invention, and we hereby disclaim the use or application of this our device or invention to any other matter or thing other than is hereinafter described and set forth, what we claim and desire to secure by Letters Patent, is—

The uniting of the outer sole, and upper manufactured wholly or in part of vulcanized india rubber, with the insole of boots and shoes, by means of cement, the cement passing through perforations made for that purpose in the upper in the manner substantially, and for the purposes above described.

HENRY G. TYER.
JOHN HELM.

Witnesses:
I. H. VOORHEES,
ELIAS I. THOMPSON.